(12) United States Patent
Miyata (10) Patent No.: US 8,672,791 B2
(45) Date of Patent: Mar. 18, 2014

(54) HYBRID DRIVING APPARATUS

(75) Inventor: Takeshi Miyata, Shizuoka-Ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 13/546,427

(22) Filed: Jul. 11, 2012

(65) Prior Publication Data

US 2013/0017915 A1    Jan. 17, 2013

(30) Foreign Application Priority Data

Jul. 13, 2011    (JP) .................................. 2011-154937

(51) Int. Cl.
*F16H 3/72* (2006.01)

(52) U.S. Cl.
USPC ............................................................ 475/5

(58) Field of Classification Search
USPC ........................................................ 475/5, 8
See application file for complete search history.

(56) References Cited

U.S. PATENT DOCUMENTS

| | | | |
|---|---|---|---|
| 8,133,150 B2 * | 3/2012 | Rogg | 477/3 |
| 2006/0116231 A1 * | 6/2006 | Supina et al. | 475/8 |
| 2009/0321157 A1 * | 12/2009 | Sowul et al. | 180/65.22 |
| 2013/0116076 A1 * | 5/2013 | Tamai et al. | 475/5 |

FOREIGN PATENT DOCUMENTS

| | | |
|---|---|---|
| JP | 10169485 A | 6/1998 |
| JP | 2011037329 A | 2/2011 |

* cited by examiner

*Primary Examiner* — Erin D Bishop
*Assistant Examiner* — Huan Le
(74) *Attorney, Agent, or Firm* — Lerner, David, Littenberg, Krumholz & Mentlik, LLP

(57) ABSTRACT

The present invention provides a first one-way clutch 23 is disposed to prevent an input shaft 3 from rotating in the direction opposite to the rotation direction of an engine 2, a first oil pump 24 is connected to an input shaft 3, a second oil pump 25 is connected to a motor generator 4 arranged adjacent to the input shaft 3 on a collinear diagram of two motor generators 4 and 5, and between the second oil pump 25 and the motor generator 4 connected to the second oil pump 25, a second one-way clutch 26 is disposed to transmit the rotation of the second oil pump 25 only when the motor generator 4 rotates in the direction opposite to the rotation direction of the input shaft 3.

2 Claims, 8 Drawing Sheets

EV RUNNING TIME WHEN ENGINE IS STOPPED AND VEHICLE IS RUN BY DRIVING FORCE OF MG2

WHEN VEHICLE IS RUN AT LOW SPEED BY DRIVING FORCE OF ENGINE AND MG2

FIG.6

NOMOGRAPHIC CHART AT TIME OF LOW-SPEED RUNNING BY USE OF ENGINE AND MG2

FIG.7
WHEN VEHICLE IS RUN AT HIGH SPEED BY DRIVING FORCE OF ENGINE AND MG1

FIG.8

HYBRID DRIVING APPARATUS

CROSS-REFERENCE TO RELATED APPLICATIONS

This application claims priority from Japanese Patent Application No. 2011-154937, filed in the Japanese Patent Office on Jul. 13, 2011, the disclosure of which is hereby incorporated herein by reference.

BACKGROUND OF THE INVENTION

The present invention relates to a hybrid driving apparatus and, more particularly, to a driving apparatus in which lubricating oil is fed to necessary parts.

In recent years, for a hybrid vehicle and a vehicle provided with an idling stop engine, there has been developed a vehicle in which an engine is stopped temporarily to improve fuel economy and to restrain the emission of carbon dioxide.

For such a vehicle, in case in which a pressure-feeding means for feeding lubricating oil to the necessary parts of a transmission system is operated by engine power, the feed rate of lubricating oil sometimes decreases depending on the engine operating condition.

For example, in case in which the vehicle mounted with the transmission system is capable of being run by the power of a driving source different from the engine while the rotation of engine is stopped, if the engine is stopped during running, the pressure-feeding means also stops, so that the feed of lubricating oil to the necessary parts stops.

For the hybrid vehicle described in JP10-169485A, an oil pump that is powered from the rotation of engine is provided, a transmission shaft is connected to the input shaft of the oil pump via a one-way clutch, and even when the engine is stopping, at the time of backward running, a generator is driven as a motor to drive the oil pump, and thereby lubricating oil is fed.

For the power train of the vehicle described in JP2001-37329A, as two motor generators, a first motor generator and a second motor generator are provided, the first motor generator is connected to a first oil pump via a one-way clutch, and the second motor generator and a ring gear are connected to the first oil pump, whereby lubricating oil is fed even when the engine is stopping.

BRIEF SUMMARY OF THE INVENTION

On the conventional vehicle including a hybrid vehicle, the durability of gear parts and the like in the transmission system decreases on account of shortage of lubrication. It can be thought to mount a motor-driven pump capable of feeding lubricating oil by using a driving source different from the input shaft of engine; however, this configuration has problems of the increase in weight due to a larger size of transmission system, the increase in cost due to an increased number of parts, and the like.

Also, it can be thought that a mechanical oil pump is installed on an axle always rotating during vehicle running. In this case, however, if the oil pump on the input shaft of engine operates, the two oil pumps become in a simultaneously operated state. Therefore, there arises a problem that the increase in friction leads to a deterioration in fuel economy.

Accordingly, an object of the present invention is to provide a hybrid driving apparatus in which a first oil pump driven by an engine and a second oil pump driven by a motor generator are prevented from being driven simultaneously, and thereby the drive loss of oil pump can be reduced.

The present invention provides a hybrid driving apparatus comprising: an engine; an input shaft connected to the engine; first and second motor generators; a power-splitter; and an output shaft for transmitting power to driving wheels, in which the power-splitter including a planetary gear mechanism which has four rotating elements rotating differentially and being indicated along a straight line in a collinear diagram; one of the two rotating elements arranged in the middle of the collinear diagram is connected to the input shaft, and the other is connected to the output shaft; the two rotating elements arranged on both ends of collinear diagram are connected to the first and second motor generators respectively; between the input shaft and a case for supporting the input shaft, a first one-way clutch is disposed to prevent the input shaft from rotating in the direction opposite to the rotation direction of the engine; and a first oil pump is connected to the input shaft, characterized in that the first motor generator is arranged adjacent to the input shaft on the collinear diagram, and is connected to a second oil pump via a second one-way clutch; and the second one-way clutch is configured so as to transmit the rotation of the second oil pump only when the first motor generator rotates in the direction opposite to the rotation direction of the input shaft.

According to the hybrid driving apparatus of the present invention, the first oil pump driven by the engine and the second oil pump driven by the motor generator are prevented from being driven simultaneously, and thereby the drive loss of oil pump can be reduced.

In a preferred mode of the present invention, the configuration is made such that, when the vehicle moves forward by the driving force supplied from the engine and the second motor generator, the rotation of the first motor generator is maintained in the same direction as the rotation of the engine, or is stopped.

DETAILED DESCRIPTION

The present invention prevents a first oil pump driven by an engine and a second oil pump driven by a motor generator from being driven simultaneously, and realizes an object of reducing the drive loss of the oil pump by connecting the second oil pump to a motor generator arranged adjacent to an input shaft on a collinear diagram of two motor generators, and by disposing a second one-way clutch, which transmits rotation to the second oil pump only when the motor generator rotates in the direction opposite to the rotation direction of the input shaft, between the second oil pump and the motor generator connected to that second oil pump.

FIGS. 1 to 8 show an Embodiment of the present invention.

Figure 1:
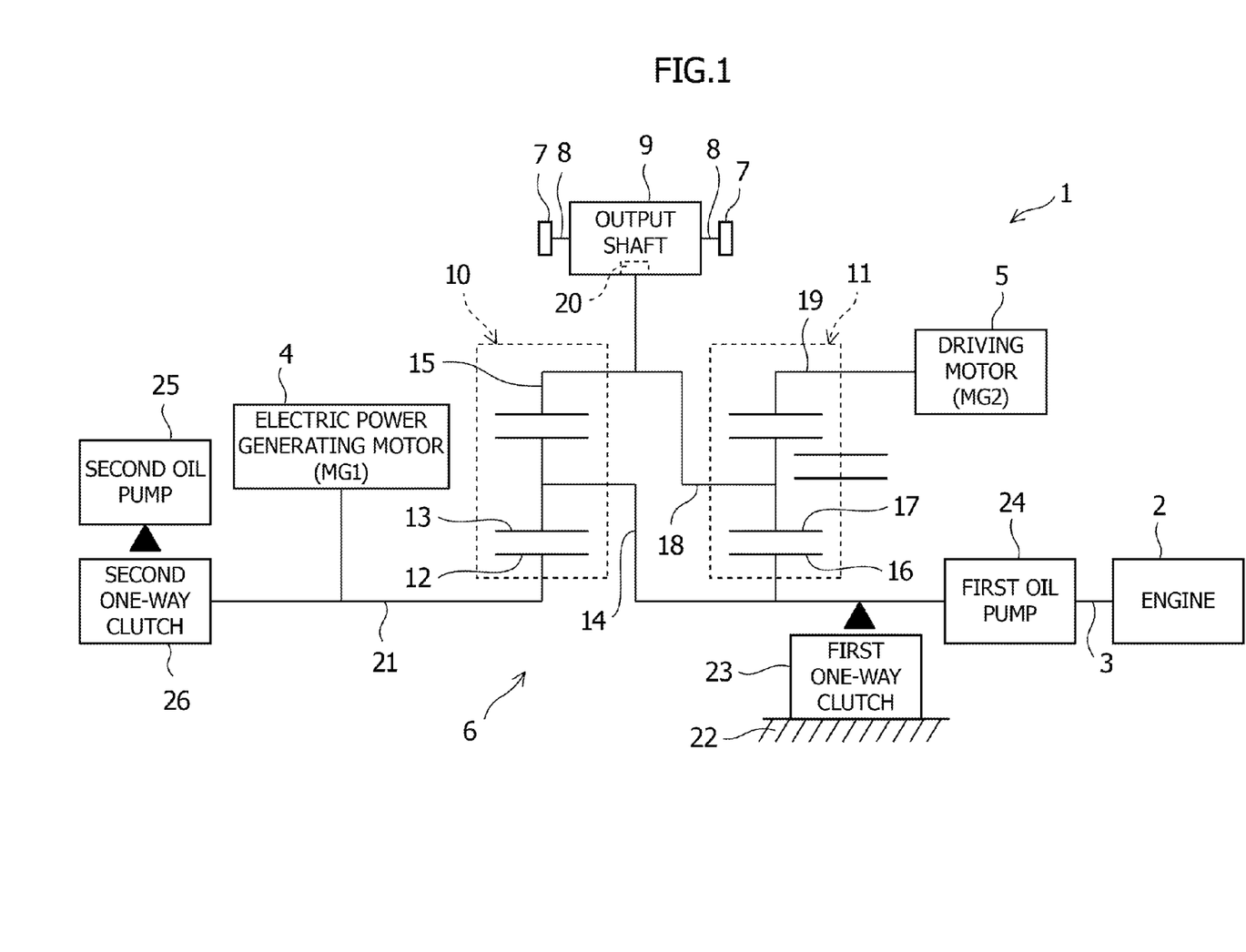
FIG. 1 is a system configuration diagram of a hybrid driving apparatus.
Figure 2:
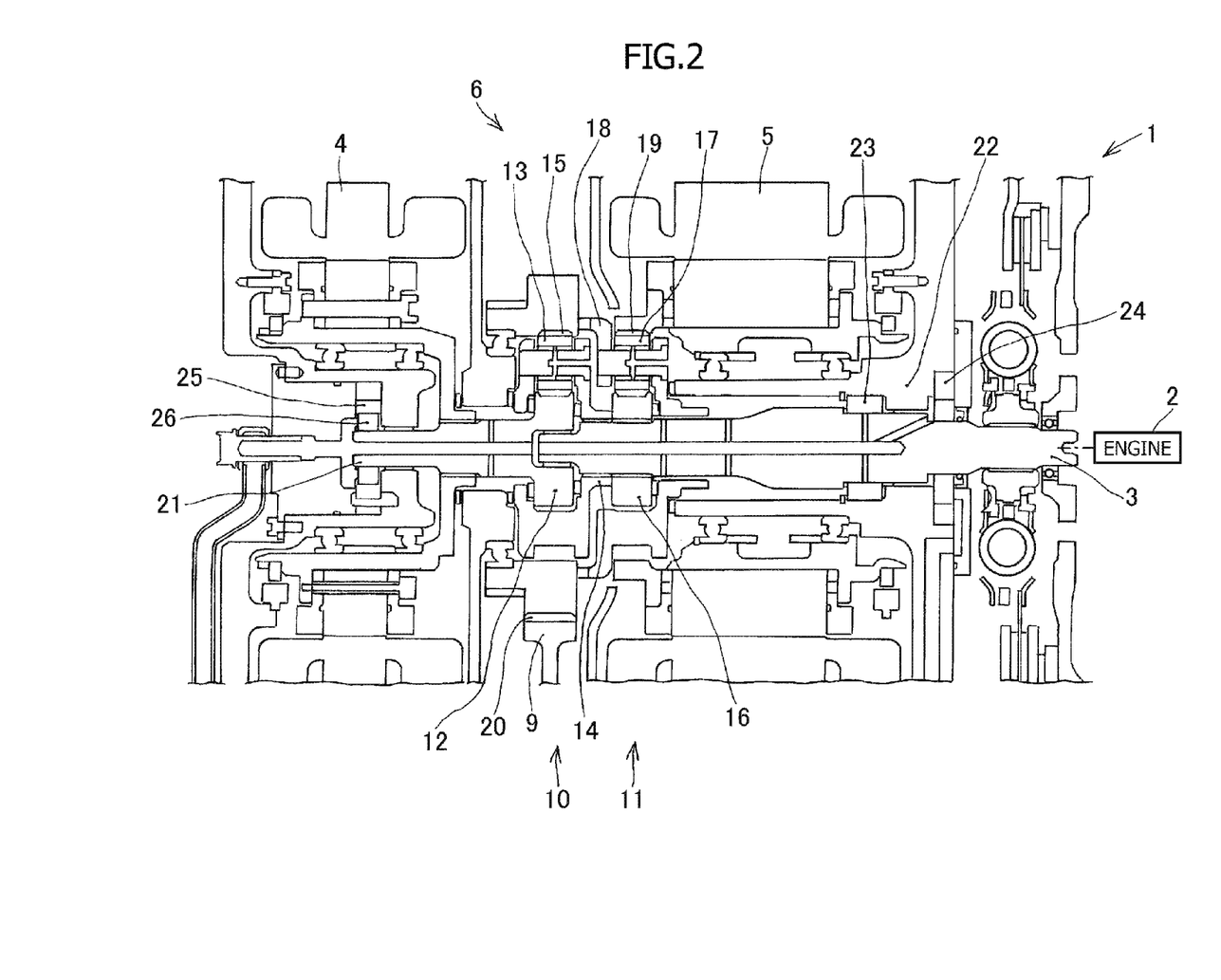
FIG. 2 is a sectional view of a hybrid driving apparatus.

In FIGS. 1 and 2, reference sign 1 denotes a hybrid driving apparatus mounted on an electric vehicle such as a hybrid vehicle.

The hybrid driving apparatus 1 includes an engine 2, which is a driving source for delivering torque, an input shaft 3 connected to the engine 1, two motor generators of a first motor generator (electric power generating motor)(in the drawings, described as "MG1") 4 and a second motor generator (driving motor) (in the drawings, described as "MG2") 5, a power-splitter 6, and an output shaft 9 for transmitting power to the right and left driving wheels 7 via drive axles 8.

The power-splitter 6 has four rotating elements rotating differentially, and is configured by a first planetary gear mechanism 10 and a second planetary gear mechanism 11 serving as a planetary gear mechanism in which the four rotating elements are indicated along a straight line in a collinear diagram.

The first planetary gear mechanism 10 includes a first sun gear 12, a first pinion gear 13 meshing with the first sun gear 12, a first carrier 14 connected to the first pinion gear 13, and a first ring gear 15 meshing with the first pinion gear 13.

The second planetary gear mechanism 11 includes a second sun gear 16, a second pinion gear 17 meshing with the second sun gear 16, a second carrier 18 connected to the second pinion gear 17, and a second ring gear 19 meshing with the second pinion gear 17.

The first sun gear 12 constitutes a first rotating element, the first carrier 14 and the second sun gear 18 constitute a second rotating element by being connected integrally, the first ring gear 15 and the second carrier 18 constitute a third rotating element by being connected integrally, and the second ring gear 19 constitutes a fourth rotating element.

In the power-splitter 6, when the first rotating element, the second rotating element, the third rotating element, and the fourth rotating element are being indicated along a straight line in the collinear diagram, the collinear diagram forms a straight line, and the rotating elements lie in the above-described order on the collinear diagram. One of the two rotating elements arranged in the central portion of the collinear diagram is connected to the input shaft 3, and the other of the two rotating elements is connected to the output shaft 9.

Specifically, the first carrier 14 and the second sun gear 16, which serve as the second rotating element, are connected to the input shaft 3, and the first ring gear 15 and the second carrier 18, which serve as the third rotating element, are connected to the output shaft 9 via an output gear 20.

Also, in the power-splitter 6, to the two rotating elements arranged at both ends on the collinear diagram, the motor generators are connected respectively.

Specifically, to the first sun gear 12 serving as the first rotating element, the first motor generator 4 is connected via a transmission shaft 21. To the second ring gear 19 serving as the fourth rotating element, the second motor generator 5 is connected.

In the hybrid driving apparatus 1, between the input shaft 3 and a transmission case 22 serving as a case for supporting the input shaft 3, a first one-way clutch 23 is disposed to prevent the input shaft 3 from rotating in the direction opposite to the rotation direction of the engine 2.

To the input shaft 3, a first oil pump 24 is connected on the engine 2 side of the first one-way clutch 23.

Of the first motor generator 4 and the second motor generator 5, the first motor generator 4 arranged adjacent to the input shaft 3 on the collinear diagram is connected to a second oil pump 25 on the transmission shaft 21.

In this case, on the transmission shaft 21 between the second oil pump 25 and the first motor generator 4 connected to the second oil pump 25, a second one-way clutch 26 is disposed to transmit the rotation to the second oil pump 25 only when the first motor generator 4 rotates in the direction opposite to the rotation direction the input shaft 3.

That is, in this Embodiment, the hybrid driving apparatus 1 includes the mechanical second oil pump 25 capable of being operated by the driving source (the first motor generator 4) different from the input shaft 3 of the engine 2, the second oil pump 25 is provided with the second one-way clutch 26 having a function of allowing the rotation in one direction and inhibiting the rotation in the opposite direction, and the feed and stop of lubricating oil can be changed over depending on the rotation direction of the driving source different from the input shaft 3 of the engine 2, whereby only when the engine 2 is stopping, the second oil pump 25 is made enable to be driven by the driving source different from the input shaft 3 of the engine 2.

Figure 3:
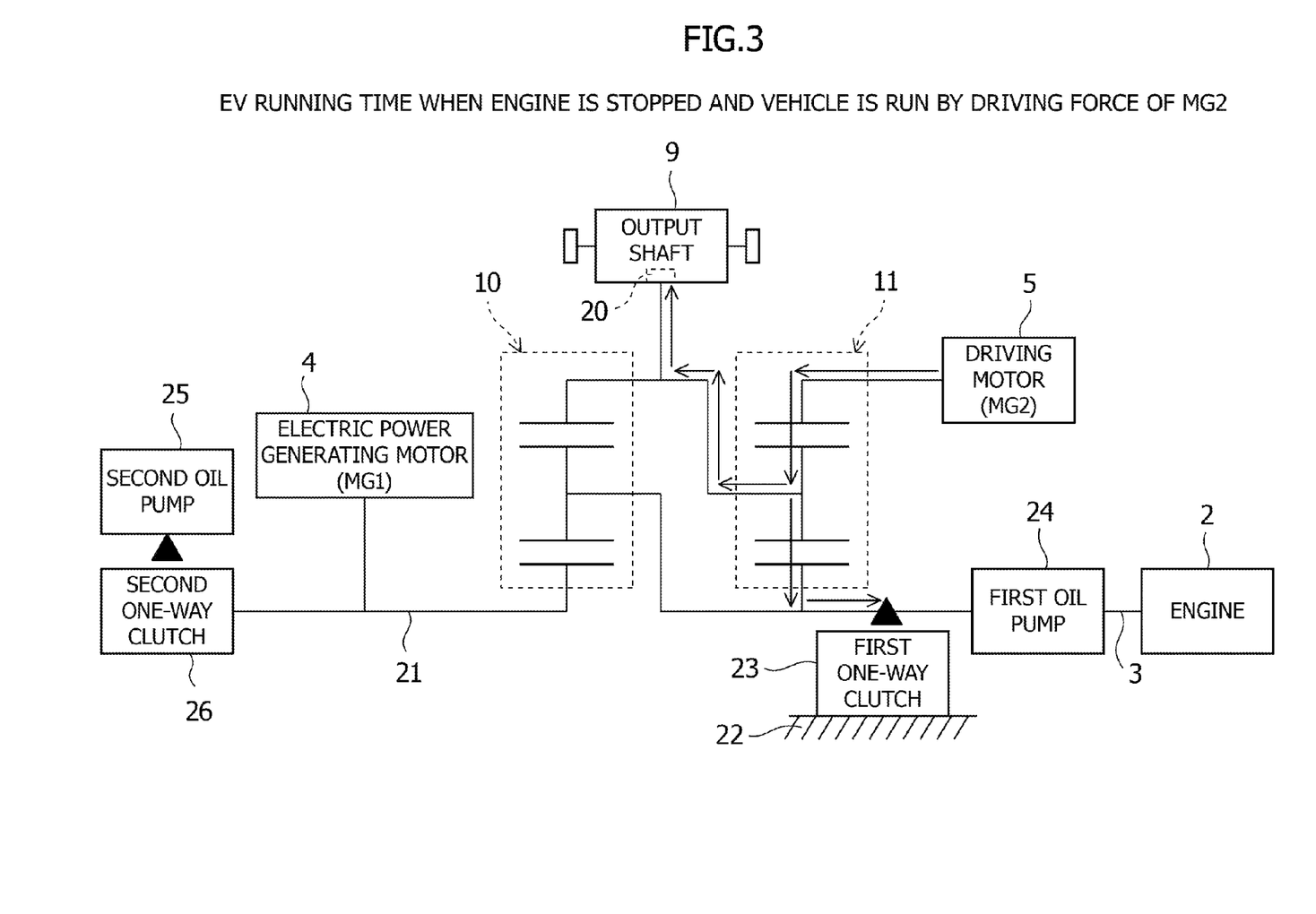
FIG. 3 is a configuration diagram of a hybrid driving apparatus at the EV running time when the engine is stopped, and the vehicle is run by the driving force of a second motor generator.
Figure 4:
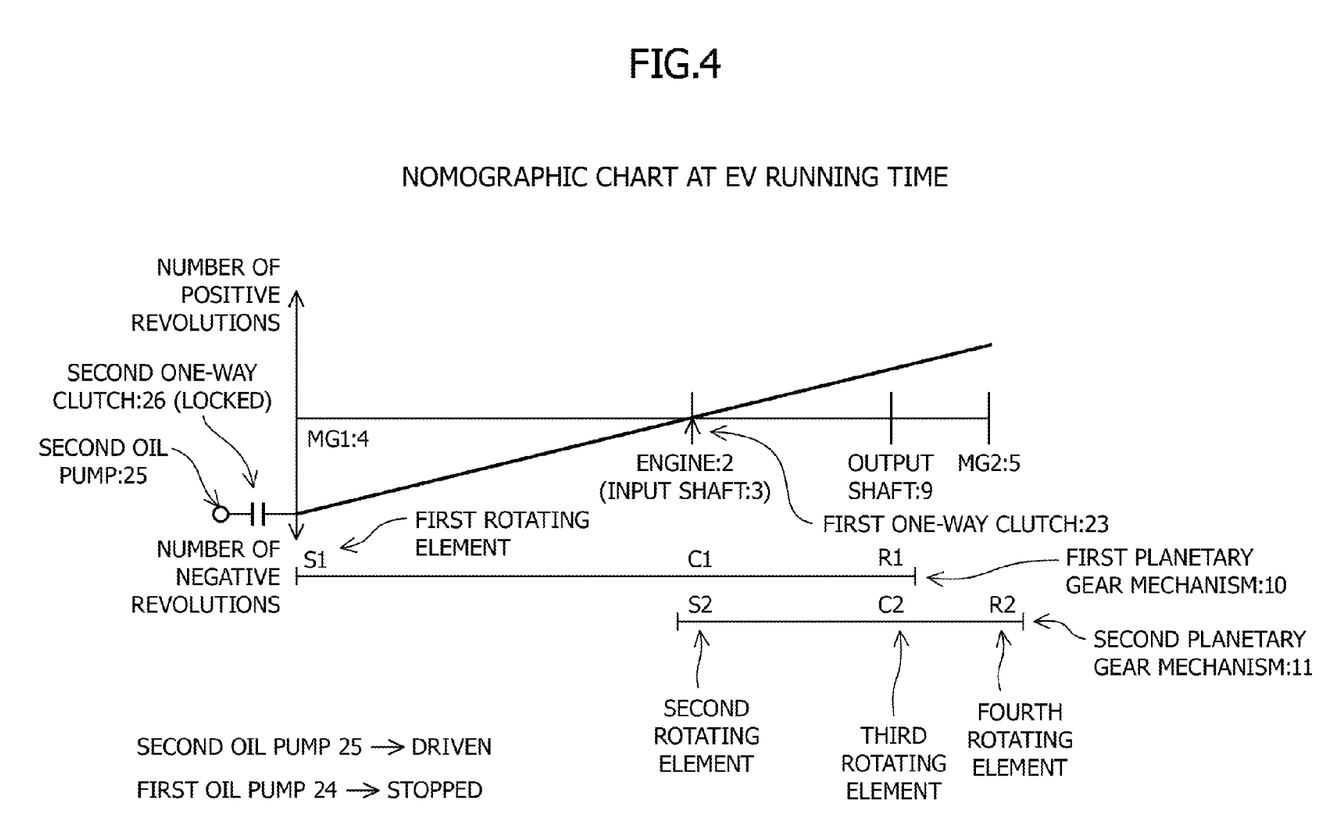
FIG. 4 is a collinear diagram at the EV running time shown in FIG. 3.

According to the above-described configuration, as shown in FIGS. 3 and 4, when the engine 2 is stopped, and the second motor generator 5 arranged adjacent to the output shaft 9 on the monographic chart is rotated in the positive direction to run the vehicle forward (EV running), by the first one-way clutch 23, the input shaft 3 is prevented from rotating in the direction opposite to the rotation direction of the engine 2, so that the first oil pump 24 can be prevented from rotating in the opposite direction.

That is, at the EV running time (at the time when the engine 2 is stopping), when the driving force of the second motor generator 5 is used as the driving force, and the driving force is transmitted to the output shaft 9 via the second planetary gear mechanism 11, the second sun gear 16 of the second planetary gear mechanism 11 rotates in the direction opposite to the rotation direction of the second carrier 18 to rotate the input shaft 3 in the direction opposite to the rotation direction of the engine 2. However, since the rotation direction of the first one-way clutch 23 is negative, the first one-way clutch 23 is locked mechanically, thereby preventing the reverse rotation of the input shaft 3.

At this time, the first motor generator 4 connected to the second oil pump 25 rotates in the direction opposite to the rotation direction of the engine 2 (the negative direction), so that the second one-way clutch 26 is locked, and the second oil pump 25 is driven.

Thereby, the second oil pump 25 is driven while the first oil pump 24 is being stopped, and lubricating oil can be fed to lubrication requiring parts, so that the drive loss caused by the simultaneous driving of the two oil pumps 24 and 25 can be reduced.

Figure 5:
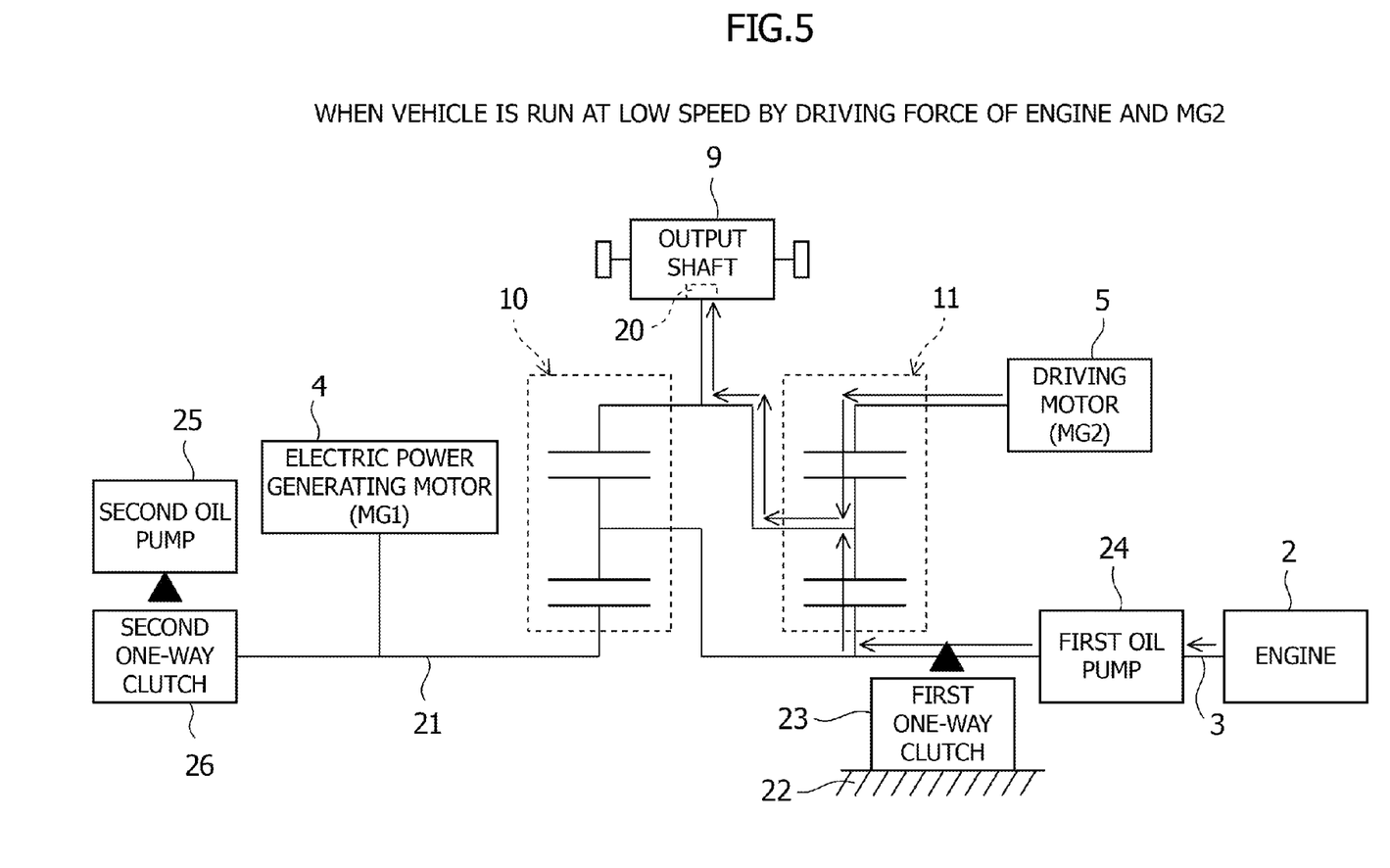
FIG. 5 is a configuration diagram of a hybrid driving apparatus at the time when the vehicle is run at a low speed by the driving force of an engine and a second motor generator.
Figure 6:
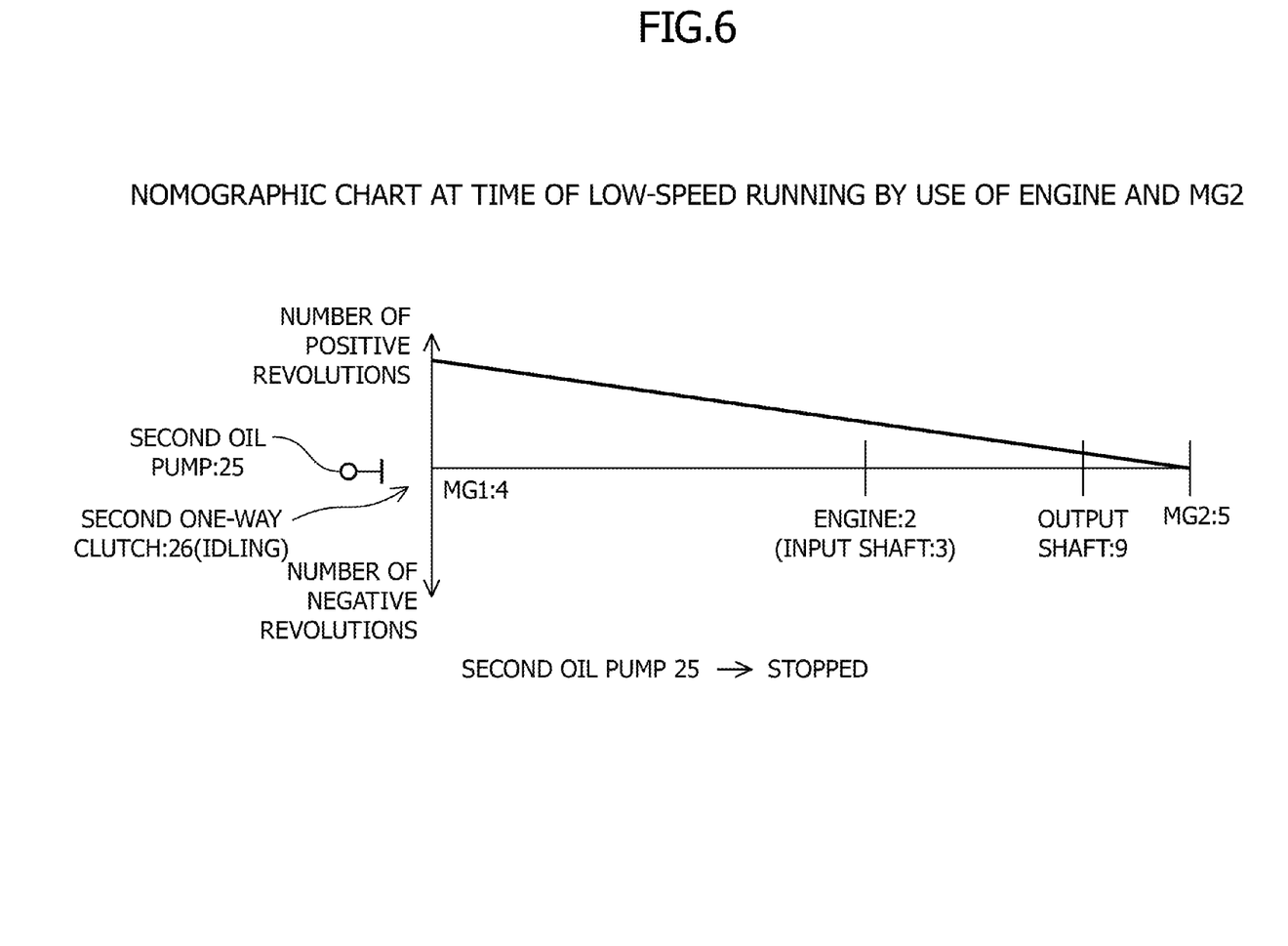
FIG. 6 is a collinear diagram at the low-speed running time shown in FIG. 5.

As shown in FIGS. 5 and 6, when the vehicle is run forward at a low speed by the driving force supplied from the engine 2 and the second motor generator 5 arranged adjacent to the output shaft 9 on the monographic chart, the first motor generator 4 connected to the second oil pump 25 rotates in the direction same as the rotation direction of the engine 2 at a rotating speed higher than the rotating speed of the engine 2.

At this time, the first oil pump 24 connected to the input shaft 3 is driven, and on the other hand, the second oil pump 25 is stopped by the idling of the second one-way clutch 26, whereby the drive loss caused by the simultaneous driving of the two oil pumps 24 and 25 can be reduced.

That is, at the time of low-speed running of HEV (the operation of the engine 2), the driving force of the engine 2 and the driving force of the second motor generator 5 are transmitted to the output shaft 9 via the second planetary gear mechanism 11. At this time, since the first motor generator 4 rotates in the positive rotation direction, the second one-way clutch 26 becomes in an idling state, thereby preventing the drive of the second oil pump 25.

In the hybrid driving apparatus 1, when the vehicle is run forward by the driving force supplied from the engine and the first motor generator 4 connected to the second oil pump 25, the first motor generator 4 connected to the second oil pump 25 is made in a state in which the rotation direction thereof is kept the same as the rotation direction of the engine 2 or the rotation thereof is stopped.

Figure 7:
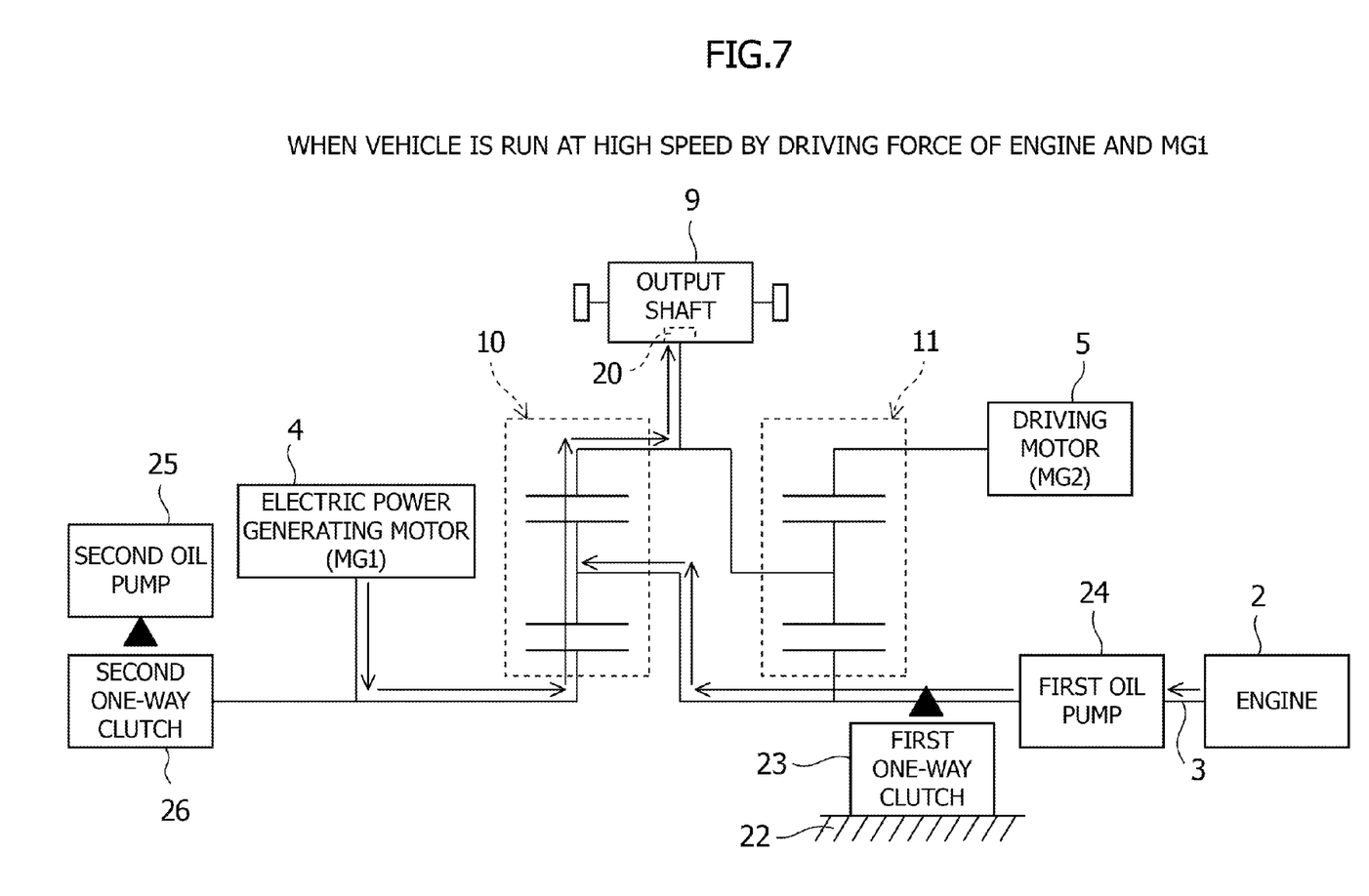
FIG. 7 is a configuration diagram of a hybrid driving apparatus at the time when the vehicle is run at a high speed by the driving force of an engine and a first motor generator.
Figure 8:
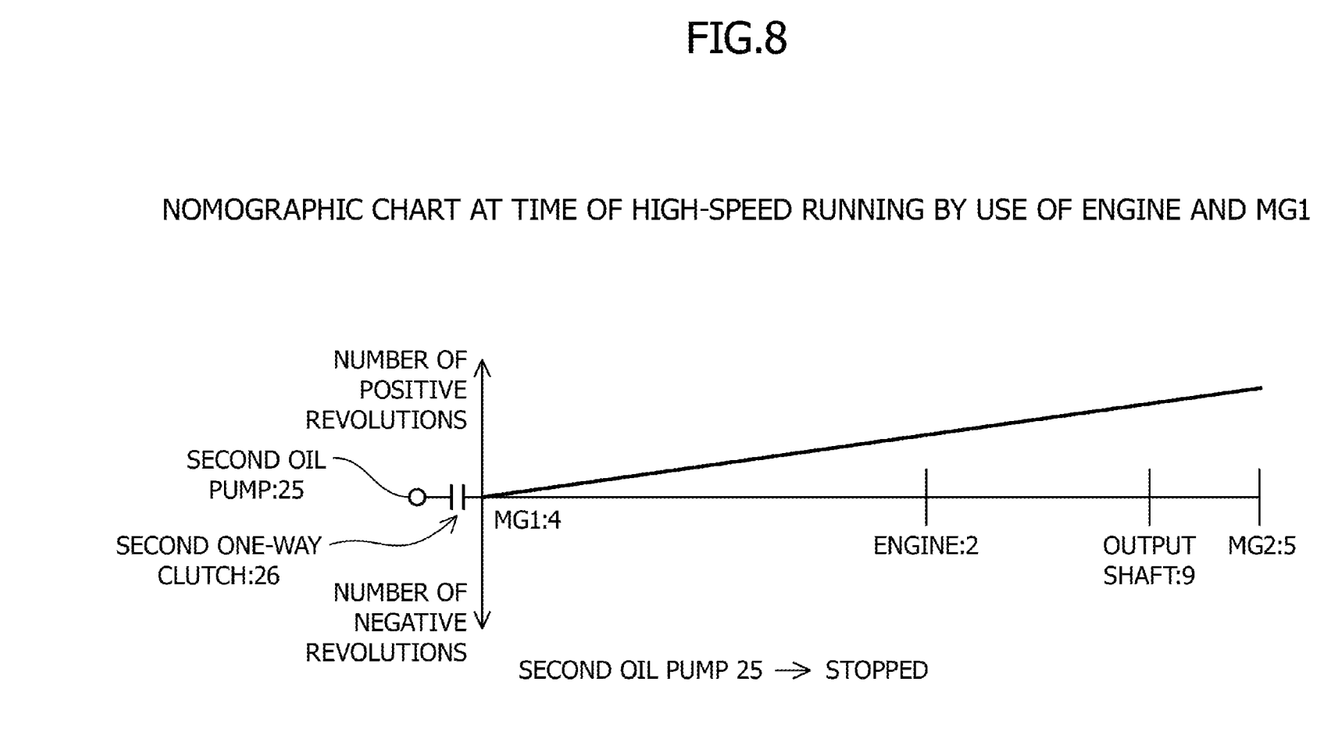
FIG. 8 is a collinear diagram at the high-speed running time shown in FIG. 7.

Thereby, as shown in FIGS. 7 and 8, when the vehicle is run forward at a high speed by the driving force supplied from the engine and the first motor generator 4 connected to the second oil pump 25, the first motor generator 4 may rotate in the direction opposite to the rotation direction of the engine 2. However, by making the first motor generator 4 in a state in which the rotation direction thereof is kept the same as the rotation direction of the engine 2 or the rotation thereof is stopped, the second oil pump 25 can be stopped while the first oil pump 24 is driven, so that the drive loss caused by the simultaneous driving of the two oil pumps 24 and 25 can be reduced.

That is, at the time of high-speed running of HEV (the operation of the engine 2), the driving force of the engine 2 and the driving force of the first motor generator 4 are transmitted to the output shaft 9 via the first planetary gear mechanism 10. At this time, since the first motor generator 4 stops rotating or rotates in the positive rotation direction, as at the time of low-speed running, the drive of the second oil pump 25 is prevented.

The hybrid driving apparatus in accordance with the present invention can be applied to a hybrid transmission, a speed reducer for electric vehicle, and the like that require a lubrication mechanism when the engine is stopping.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A hybrid driving apparatus comprising:
an engine;
an input shaft connected to the engine;
a first oil pump connected to the input shaft;
first and second motor generators;
a second oil pump connected to the first motor generator;
an output shaft for transmitting power to driving wheels;
and a power-splitter including:
   a first planetary gear mechanism having a first sun gear, a first ring gear and a first carrier; and
   a second planetary gear mechanism having a second sun gear, a second ring gear and a second carrier;
   wherein the first sun gear constitutes a first rotating element, the first carrier and the second sun gear constitute a second rotating element by being connected integrally, the first ring gear and the second carrier constitute a third rotating element by being connected integrally, and the second ring gear constitutes a fourth rotating element, so that the first and the second planetary gear mechanisms have four rotating elements rotating differentially, the second rotating element is connected to the input shaft, and the third rotating element is connected to the output shaft;
   wherein one of the first and fourth rotating elements is connected to the first motor generator, and another of the first and fourth rotating elements is connected to the second motor generator;
   and wherein between the input shaft and a case for supporting the input shaft, a first one-way clutch is disposed to prevent the input shaft from rotating in the direction opposite to the rotation direction of the engine;
wherein the first motor generator is connected to the second oil pump via a second one-way clutch, the second one-way clutch being configured to transmit the rotation of the second oil pump only when the first motor generator rotates in the direction opposite to the rotation direction of the input shaft.

2. The hybrid driving apparatus according to claim 1, wherein the apparatus is configured such that, when the vehicle moves forward by the driving force supplied from the engine and the second motor generator, the rotation of the first motor generator is maintained in the same direction as the rotation of the engine, or is stopped.

\* \* \* \* \*